No. 694,247. Patented Feb. 25, 1902.
T. P. BROWN.
TREE SUPPORT.
(Application filed Nov. 7, 1901.)
(No Model.)
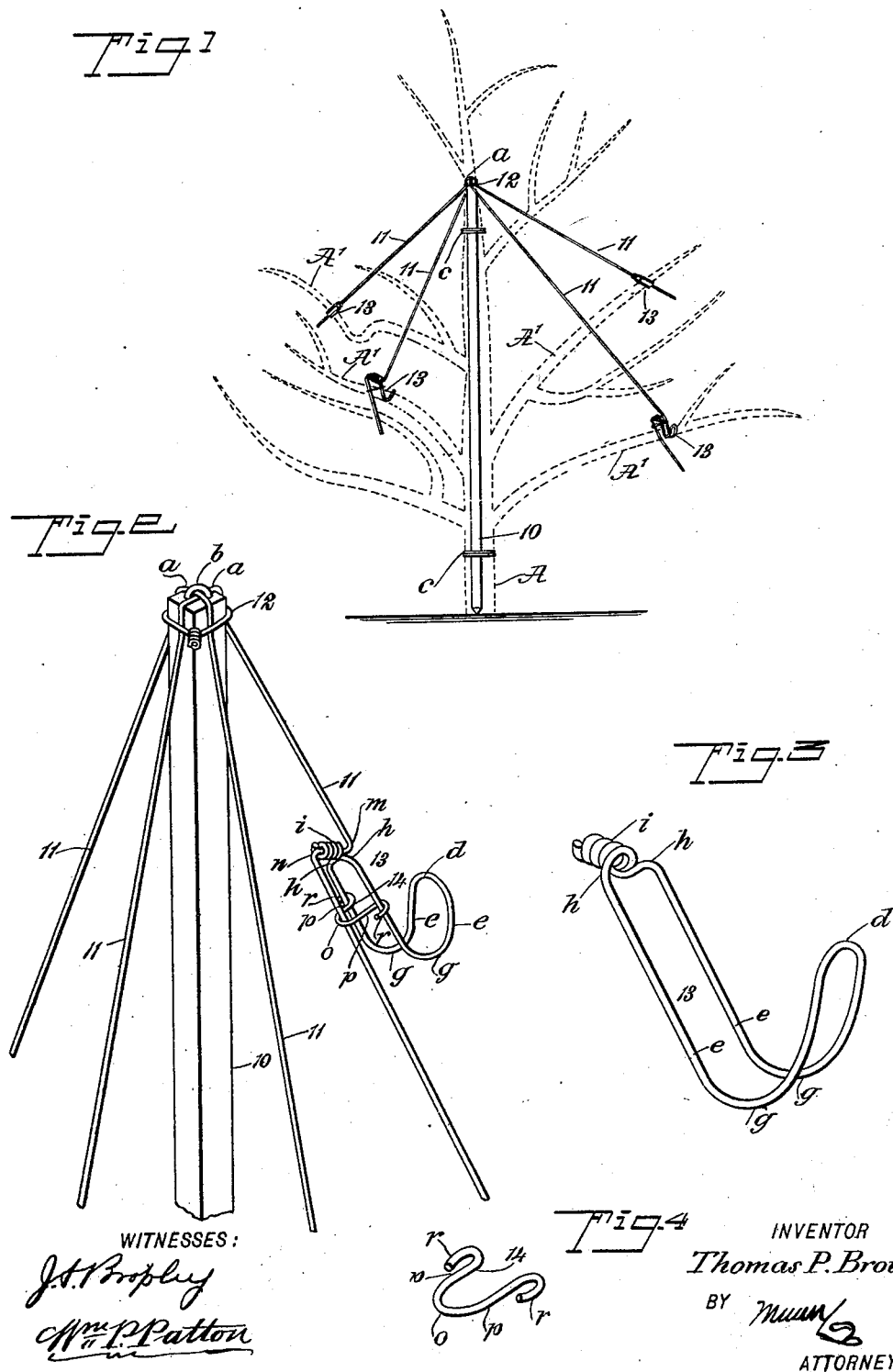
WITNESSES:
J. H. Brophy
Wm. P. Patton
INVENTOR
Thomas P. Brown
BY Munn
ATTORNEYS

UNITED STATES PATENT OFFICE.

THOMAS PORTER BROWN, OF RIVERSIDE, CALIFORNIA.

TREE-SUPPORT.

SPECIFICATION forming part of Letters Patent No. 694,247, dated February 25, 1902.

Application filed November 7, 1901. Serial No. 81,362. (No model.)

*To all whom it may concern:*

Be it known that I, THOMAS PORTER BROWN, a citizen of the United States, and a resident of Riverside, in the county of Riverside and State of California, have invented a new and Improved Tree-Support, of which the following is a full, clear, and exact description.

This invention relates to means for supporting heavily-laden limbs of fruit-trees during the bearing season, and has for its object to provide a novel simple device which may be conveniently applied upon or removed from a tree and when in position will afford a reliable support to the limbs of the tree, avoid chafing the bark, dispense with the need of numerous prop-poles, and be adapted for package into compact bundles when not in service.

The invention consists in the novel construction and combination of parts, as hereinafter described, and defined in the appended claims.

Reference is to be had to the accompanying drawings, forming a part of this specification, in which similar characters of reference indicate corresponding parts in all the figures.

Figure 1 is a perspective view of the improved tree-support shown applied to a tree, indicated by dotted lines. Fig. 2 is an enlarged detached perspective view of the invention. Fig. 3 is an enlarged detached perspective view of a novel bracket-hook employed, and Fig. 4 is a perspective view of a novel clamp employed.

In carrying into effect the features of the invention a straight prop-pole 10 is provided, preferably formed of wood and proportioned in length to suit the height of the tree the limbs of which it is to support. A suitable number of hanger-strands 11 have one end secured upon the upper end of the prop-pole 10, the connection of the strands with the pole being preferably as shown in Figs. 1 and 2. In this construction the hanger-strands 11, which may be of wire, are formed in pairs, each pair being produced from a wire rod bent between its ends, so as to provide a connecting-loop $a$. The pairs of hanger-strands 11 have the loops $a$ seated upon the upper end of the pole 10 and upon each other, as represented in Fig. 2, and held in place thereon by a staple $b$, driven into the upper end of the pole, the limbs of the staple embracing the loops $a$. The hanger-strands 11 are further secured upon the pole 10 by a clip-band 12, formed of a piece of wire bent into ring shape and clamped upon the strands near the top of the pole by twisting the ends of the band together, as shown in Fig. 2.

It will be seen that the hanger-strands 11, which may be of any suitable length, depend on all sides of the pole 10, and if the pole is placed at a tree A said strands may be passed downward between the limbs A' of the tree in different directions, so as to be disposed adjacent to such limbs as need support, and, as indicated at $c$ in Fig. 1, the pole when in use is held upright by lashing it to the tree-body.

To connect the hanger-strands 11 with the limbs A' of the tree, so as to support the limbs, bracket-hooks 13 are provided, each hook being bent from a single wire rod, as shown in Figs. 2 and 3. In the construction of each bracket-hook 13 the material is bent, as at $d$, near its center, thereby producing two spaced members $e$, curved at $g$ into hook form. The ends of the wire material are bent toward each other, as shown at $h$, and then coiled together, so as to provide a tubular arm $i$, which projects away from the members $e$ at a suitable angle.

In arranging the device for the support of the limbs A' of a tree A the pole 10 is first secured upon the tree in an upright position by the lashing $c$, and the hanger-strands 11 are successively stretched toward the limbs to which they are to be connected. One of the bracket-hooks 13 is now placed upon a strand 11 by passing the lower end of the strand through the tubular arm $i$ outwardly from the bends $h$. The hook portion of the bracket is now placed beneath the limb it is to support and then the bracket-hook is slid upward on the hanger-strand, so as to stretch the strand taut and impose the weight of the limb and the fruit it carries upon the hook and strand, the hook being held from slipping downward by producing the offset bends $m\ n$ in the hanger-strand at each end of the tubular arm $i$.

It will be seen that the portion of the hanger-strand 11 which depends from the outer bend $n$ passes close to the members $e$ of the bracket-hook 13, and if the load to be sustained by the hook is considerable the offset portion of the hanger-strand engaged by the tubular arm $i$ is prevented from sagging or straightening out under the imposed load strain by means of the keeper-brace 14. (Shown clearly in Figs. 2 and 4.)

In constructing the keeper-braces 14 each may with advantage be formed of a piece of wire, which is first bent at $o$ between its ends, affording two spaced limbs $p$, respectively, bent near their ends to form similar hooks $r$, which are disposed outwardly or away from each other and in the same plane with the looped end $o$.

In applying the keeper-braces 14 the looped end $o$ thereof is engaged with the depending free portion of a hanger-strand 11, and the latter is forced toward the members $e$ of the bracket-hook 13, so as to permit the hooks $r$ to be engaged with said hook members $e$. It will be obvious that the load-strain imposed upon the bracket-hook 13, which has a tendency to straighten out the bends $m\ n$, will be counteracted by the applied keeper-brace 14 and the support of the limb be assured.

It is to be understood that the prop-pole may be of metal, if preferred, and the hanger-strands may be of wire cordage, if this is considered most available for the purpose. Furthermore, the bracket-hooks employed, as well as the keeper-braces, can be cast into form from metal should this be found desirable, and more than one bracket-hook may be placed on a hanger-strand.

It will be seen that the improved tree-support is inexpensive to manufacture, is strong, light, easily applied and removed, is reliable in use, and that a number of such supports may be assembled to form a compact bundle for storage when not in use or to facilitate transportation, as occasion may require.

Having described my invention, I claim as new and desire to secure by Letters Patent—

1. A tree-support, comprising a pole, hanger-strands pendent from the pole and having offset portions, and bracket-hooks for supporting limbs of the tree, said hooks being securable at different heights on the hanger-strands, by their engagement with offset portions of said hanger-strands.

2. A tree-support, comprising a pole, hanger-strands pendent from the pole, bracket-hooks adapted to engage with offset portions on the hanger-strands, and means to hold the bracket-hooks from displacement.

3. A tree-support, comprising a pole securable upright on a tree, a plurality of hanger-strands held to depend from the pole, and a bracket-hook for each hanger-strand, comprising a hook member and a tubular arm extended at an angle from said hook member and mounted upon a respective hanger-strand.

4. In a tree-support of the character described, the bracket-hooks, each formed of a wire strand bent to provide two spaced hook members, that are coiled at their ends, forming a tubular arm which projects at an angle from the hook members.

5. In a tree-support of the character described, a supported wire strand, a bracket-hook having an angularly-disposed tubular arm engaged with an offset portion of the hanger-strand, and a keeper-brace engaged with said hook and with a depending part of the hanger-strand.

In testimony whereof I have signed my name to this specification in the presence of two subscribing witnesses.

THOMAS PORTER BROWN.

Witnesses:
J. A. SIMMS,
C. R. STIBBENS.